(12) United States Patent
Bond et al.

(10) Patent No.: US 9,286,677 B2
(45) Date of Patent: Mar. 15, 2016

(54) REORIENTATION OF CARDIAC IMAGES

(71) Applicants: Sarah Bond, Oxford (GB); Xiao-Bo Pan, Oxford (GB)

(72) Inventors: Sarah Bond, Oxford (GB); Xiao-Bo Pan, Oxford (GB)

(73) Assignee: Siemens Medical Solutions USA, Inc., Malvern, PA (US)

( * ) Notice: Subject to any disclaimer, the term of this patent is extended or adjusted under 35 U.S.C. 154(b) by 115 days.

(21) Appl. No.: 14/177,584

(22) Filed: Feb. 11, 2014

(65) Prior Publication Data
US 2014/0226880 A1   Aug. 14, 2014

(30) Foreign Application Priority Data

Feb. 11, 2013   (GB) .................................. 1302390.8

(51) Int. Cl.
*G06K 9/00* (2006.01)
*G06T 7/00* (2006.01)
*G06T 7/60* (2006.01)

(52) U.S. Cl.
CPC ............ *G06T 7/0016* (2013.01); *G06T 7/0044* (2013.01); *G06T 7/608* (2013.01); *G06T 2207/10104* (2013.01); *G06T 2207/10108* (2013.01); *G06T 2207/30048* (2013.01)

(58) Field of Classification Search
None
See application file for complete search history.

(56) References Cited

U.S. PATENT DOCUMENTS

| | | | |
|---|---|---|---|
| 2005/0033143 A1* | 2/2005 | O'Donnell et al. | 600/407 |
| 2005/0261577 A1 | 11/2005 | Ficaro et al. | |
| 2007/0236491 A1* | 10/2007 | Hundley et al. | 345/418 |
| 2009/0028404 A1* | 1/2009 | Bussadori et al. | 382/130 |
| 2009/0180675 A1* | 7/2009 | Li et al. | 382/130 |
| 2009/0190810 A1* | 7/2009 | Fischer | 382/128 |
| 2010/0232645 A1* | 9/2010 | Blaffert et al. | 382/103 |
| 2012/0134569 A1* | 5/2012 | Schummers et al. | 382/133 |

OTHER PUBLICATIONS

Faber, Tracy L., et al. "Automatic alignment of myocardial perfusion images with contrast cardiac tomography." Nuclear Science Symposium Conference Record (NSS/MIC), 2010 IEEE. IEEE, 2010.*
"Automatic Reorientation of Cardiac Perfusion PET Images Using Intensity and Contrast Invariant Structure Information," Pan et al., IEEE NSS/MIC, Dresden, Germany, Oct. 19-25, 2008.

* cited by examiner

*Primary Examiner* — Li Liu
(74) *Attorney, Agent, or Firm* — Steven H. Noll

(57) ABSTRACT

In a method for estimating an orientation of a cardiac long axis from corresponding early frame and late frame images implemented in a computerized processor, a bounding box of the myocardium is defined in the late frame image and the bounding box is applied to the early frame image. A main axis of the image of the early frame within the bounding box is estimated, and the image of the early frame is oriented according to the estimated main axis. A main axis of the image of the late frame within the bounding box is also estimated, and the late frame image is reoriented according to the estimated main axis. The estimated main axis of the early frame to the estimated main axis of the late frame are compared, and in attribute of the comparison result is made available as an output from the processor.

10 Claims, 6 Drawing Sheets

LV blood pool

High moment of inertia

LV blood pool

Moment of inertia minimised

LV blood pool

Initial long axis estimate
based on late frames

LV blood pool

Long axis estimate based
on blood pool frame

REORIENTATION OF CARDIAC IMAGES

BACKGROUND OF THE INVENTION

1. Field of the Invention

The present invention concerns a method for reorienting cardiac images that are among a number of successively obtained cardiac images, and in particular to such a method that is implemented in a computerized processor.

2. Description of the Prior Art

Images of the heart for medical diagnosis may be produced using a PET (Positron Emission Tomography) imaging modality or SPECT (Single Particle Emission Computed Tomography) imaging modality. PET or SPECT imaging does not directly detect the location of body features. Rather, a tracer is introduced into a patient's bloodstream, and the location and density of the tracer is detected. An effect of this is that early images show the location of blood, carrying the tracer. Later images show the position of muscle tissue such as myocardium, once tracer has been absorbed into the muscle tissue. The heart may accordingly be imaged in two distinct phases—early frames, which represent the location of volumes of blood within the heart, and late frames, which represent the location of myocardium: muscle tissue of the heart.

It is often required in cardiac imaging to perform segmentation and reorientation of the Left Ventricle (LV) of the heart. The reorientation is performed such that the LV can be displayed with its main—longest—axis being shown horizontally or vertically. Such views are conventionally known as the long- and short-axis views.

Such reorientation must deal with several challenges, for example:

Defects in the myocardium uptake represented on late frames may cause ambiguous reorientation judgments, whether the reorientation judgments are performed by a human operator or an automatic algorithm.

A corresponding early frame image, which shows the shape and position of a blood pool, can be used to aid the reorientation to ensure that the correct reorientation angle is used.

FIG. 1A shows an example late frame, indicating myocardium position, and FIG. 1B shows a corresponding early frame, indicating blood position, at a first reorientation angle.

FIG. 1C shows an example late frame, indicating myocardium position, and FIG. 1D shows a corresponding early frame, indicating blood position, at a second reorientation angle.

FIGS. 2A-2D show corresponding images for a different patient. This patient has a left ventricle with a curved shape. In such cases, the early frame blood pool image may be used to help to achieve a consistent result.

FIG. 2A shows an example late frame, indicating myocardium position, and FIG. 2B shows a corresponding early frame, indicating blood position, at a first reorientation angle.

FIG. 2C shows an example late frame, indicating myocardium position, and FIG. 2D shows a corresponding early frame, indicating blood position, at a second reorientation angle.

Conventional practice is to perform a visual inspection and reorientation based on the late frame or a summed late frame image of the myocardium only. This can lead to errors in further processing of the image data, especially when it comes to comparing multiple datasets. The early frame blood pool image is not usually checked.

Known automatic reorientation methods have been found to generate unsatisfactory results. These results may be improved by use of a corresponding early frame blood pool information to assist in reorientation of a late frame myocardium image.

FIG. 3A shows an example late frame, indicating myocardium position, and FIG. 3B shows a corresponding early frame, indicating blood position, at an initial, inappropriate, reorientation angle.

FIG. 3C shows an example late frame, indicating myocardium position, and FIG. 3D shows a corresponding early frame, indicating blood position, at an improved reorientation angle.

SUMMARY OF THE INVENTION

An object of the present invention is to provide a method for reorienting images, such as cardiac images, wherein the disadvantages of known procedures as described above are avoided, or at least minimized.

The above object is achieved in accordance with the present invention by a method for estimating an orientation of a cardiac long axis from an early frame image and a late frame image corresponding thereto. The method is implemented in a computerized processor, wherein a bounding box of the myocardium is defined in the late frame image, and the bounding box is then applied to the early frame image. A main axis of the image in the early frame within the bounding box is estimated, and the image of the early frame is reoriented according to the estimated main axis. A main axis of the image of the late frame within the bonding box is also estimated, and the late frame image is reoriented according to the estimated main axis. The estimate main axis of the early frame to the estimated main axis of the late frame image is compared, and an attribute of the comparison result is made available as an output from the processor.

DESCRIPTION OF THE PREFERRED EMBODIMENTS

The present invention accordingly provides a method that identifies automatically the early frame blood pool image corresponding to a late frame image, and compares reorientation angles that have been found, either manually or automatically, from the late frame to a major axis found in the blood pool image.

A thresholding step may be used to determine whether the reorientation angle determined from the late frame differs significantly from the major axis identified in the early, blood pool, image. If a significant difference is identified, being in excess of a defined threshold, a warning is given to a user. Optionally, the blood pool image may be displayed for verification and new reorientation angle(s) may be suggested.

The early frame blood pool image which is automatically identified in the method of the present invention may be selected by identifying the peak frame containing the blood pool image. This image is preferably displayed either in the cardiac view or the orthogonal view to help eliminate the ambiguity on the reorientation.

The peak frame may be identified by looking at a time activity curve (TAC) over the blood pool region—for example, by monitoring a blood input function (BIF) or averaged activity over a heart bounding box.

Figure 1A:
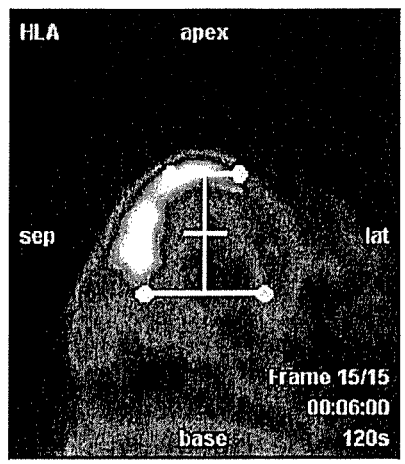
FIGS. 1A-3D show image frames as described above.
Figure 1B:
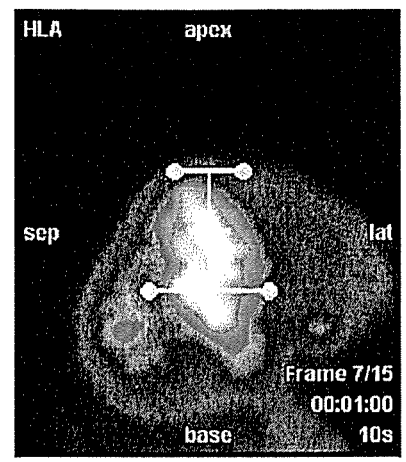
Figure 1C:
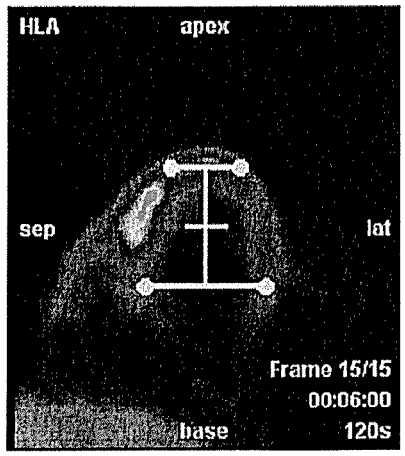
Figure 1D:
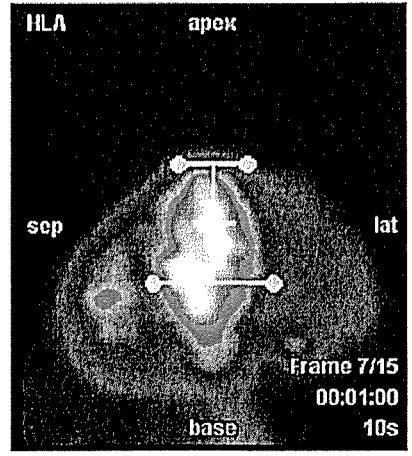
Figure 2A:
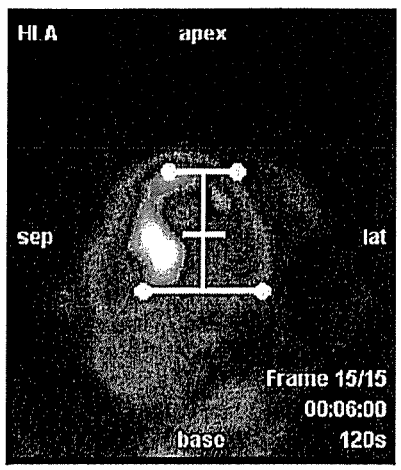
Figure 2B:
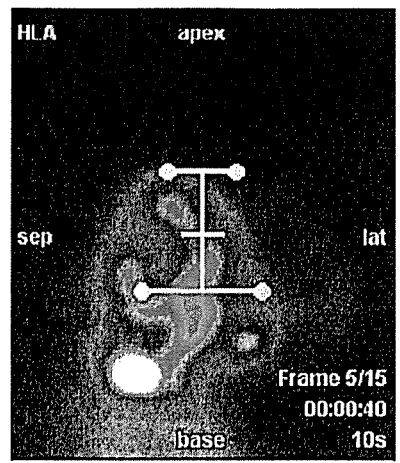
Figure 2C:
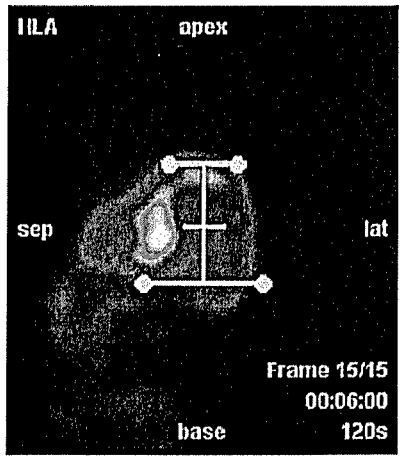
Figure 2D:
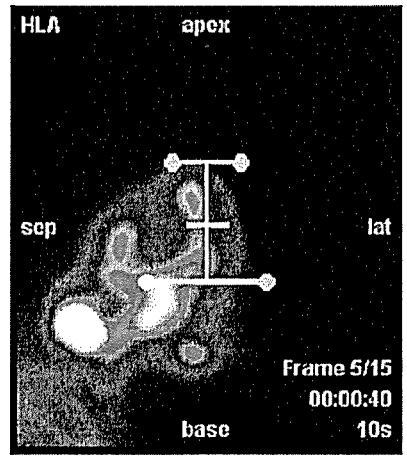
Figure 3A:
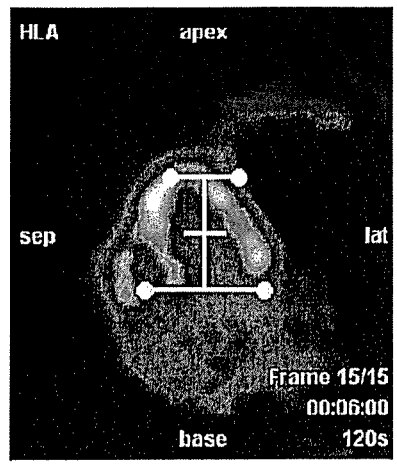
Figure 3B:
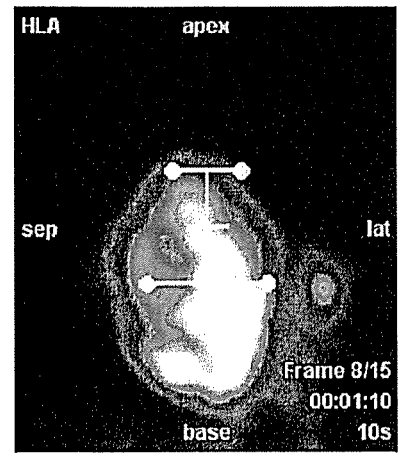
Figure 3C:
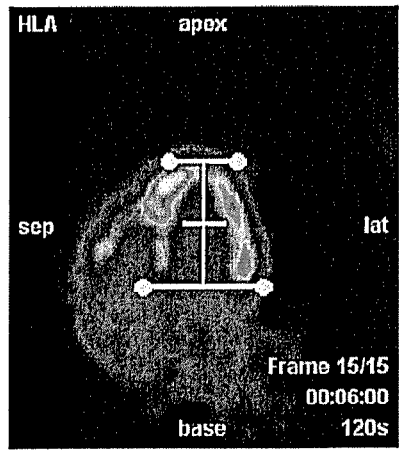
Figure 3D:
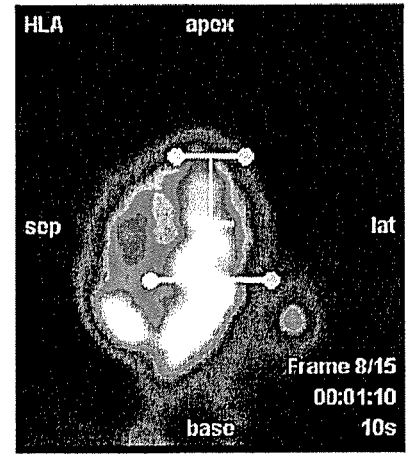
Figure 4:
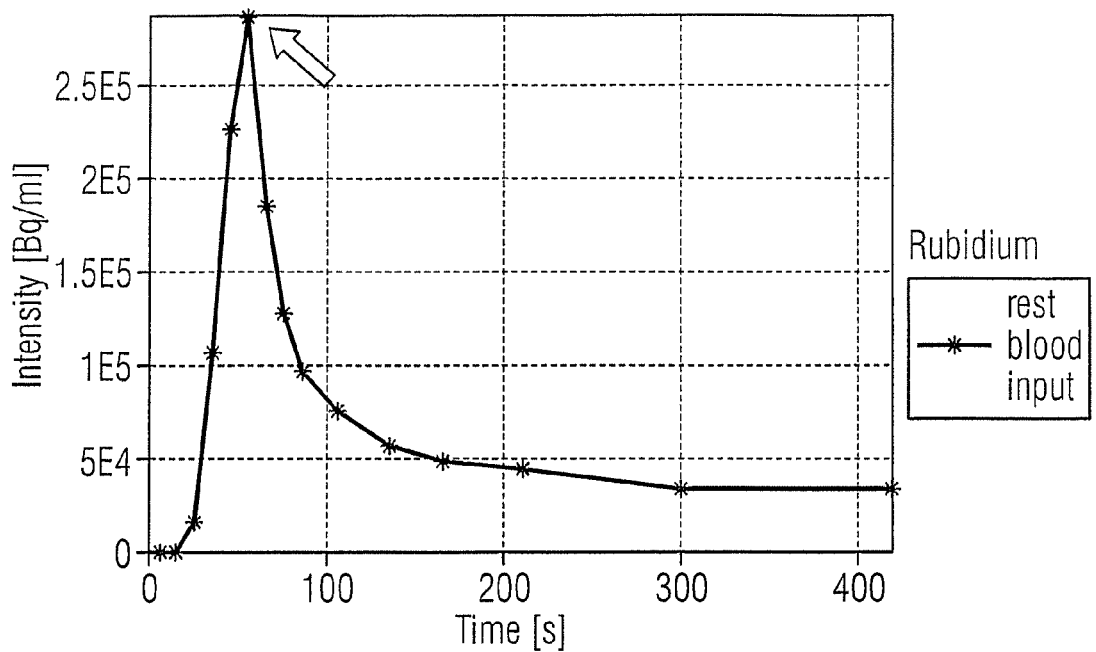
FIG. 4 shows an example blood input function (BIF) using a rubidium-based tracer.

FIG. 4 shows an example Time Activity Curve (TAC) over time, using a rubidium-based tracer. The peak in the TAC, illustrated with an arrow in FIG. 4 will indicate the image frame that should be used. The selected frame will have the highest intensity of tracer within the blood, and so should provide the clearest illustration of location of blood.

A major axis and reorientation angle is calculated on the selected early peak frame showing the blood pool. This will be considered further below with reference to FIG. 6.

Figure 5A:
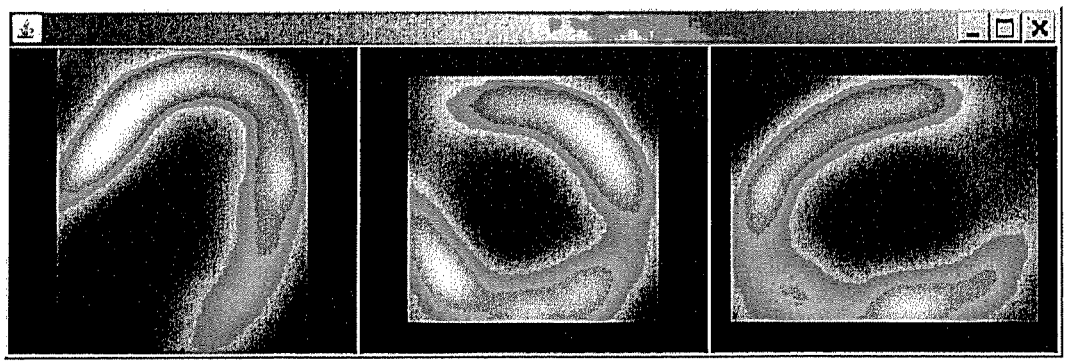
FIG. 5A shows three views of a late frame image in which a bounding box is defined around the representation of the myocardium.

A tight bounding box of the myocardium may be obtained from a corresponding late frame image. FIG. 5A illustrates tight bounding boxes generated for each view of the late frame myocardium image.

Figure 5B:
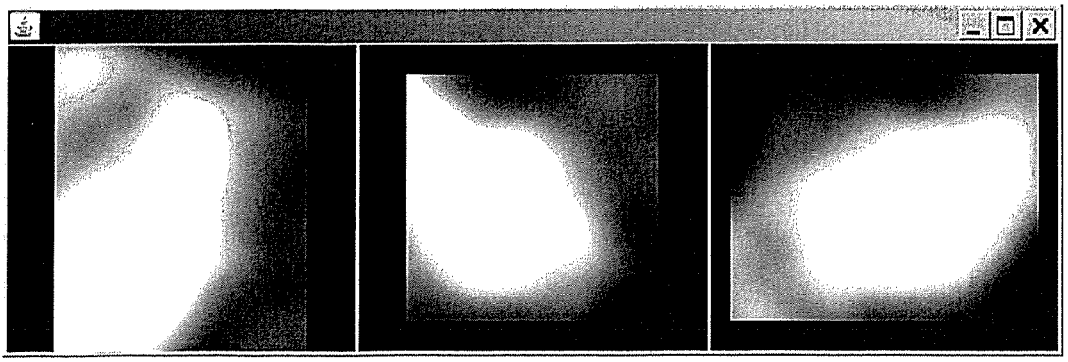
FIG. 5B shows three views of a corresponding early frame image in which the bounding box defined around the representation of the myocardium, as shown in FIG. 5A, is employed to define an image region.

The calculated bounding box is applied to the early blood pool image, and the resulting cropped early frame used to compute the major axis of the blood pool image. FIG. 5B illustrates the bounding boxes calculated from the late frame images of FIG. 5A applied to the corresponding early frame images.

Calculation of the bounding boxes may be done using the phase based method as described in X-B Pan, S Bond, G Platsch, R Eisner, J Declerck, *Automatic Reorientation of Cardiac Perfusion PET Images Using Intensity and Contrast Invariant Structure Information*, IEEE NSS/MIC, Dresden, 19-25 Oct. 2008 or a moment of inertia calculation.

Figure 6A:
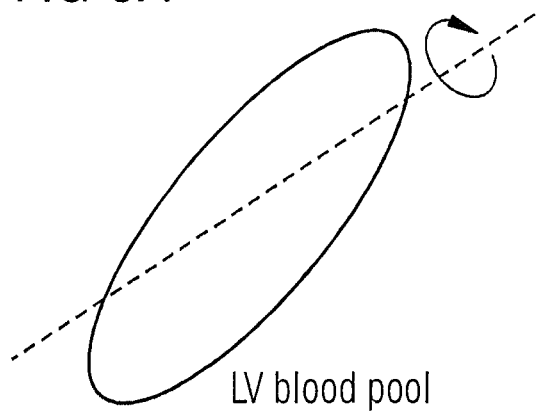
FIGS. 6A-6B illustrate the concept of calculation and minimization of a moment of inertia of an irregularly shaped image region.
Figure 6B:
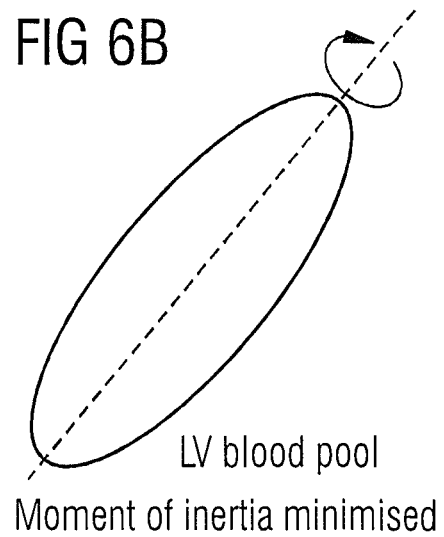

FIGS. 6A-6B illustrate the concept of moment of inertia in identifying a long axis of an irregular shape. By allocating a nominal mass per unit area of the shape, moment of inertia of the shape about a nominal axis of rotation, shown, can be calculated. The orientation of the axis of rotation can be varied, and the moment of inertia recalculated. The calculated moment of inertia will be a minimum when the axis or rotation is aligned with the long axis of the shape, in this example representing the LV blood pool region.

Figure 7A:
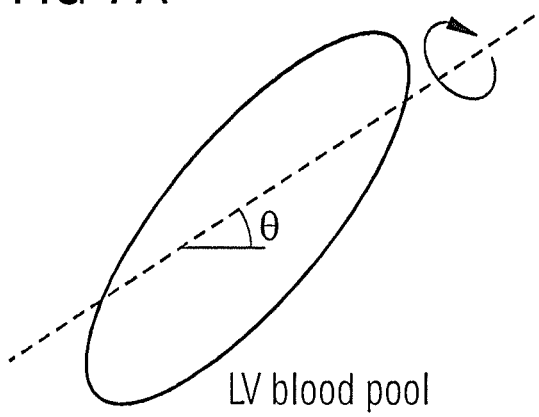
FIGS. 7A-7B illustrate the concept of thresholding of a calculated error in alignment of an alignment axis calculated by the method described with reference to FIGS. 6A-6B.
Figure 7B:
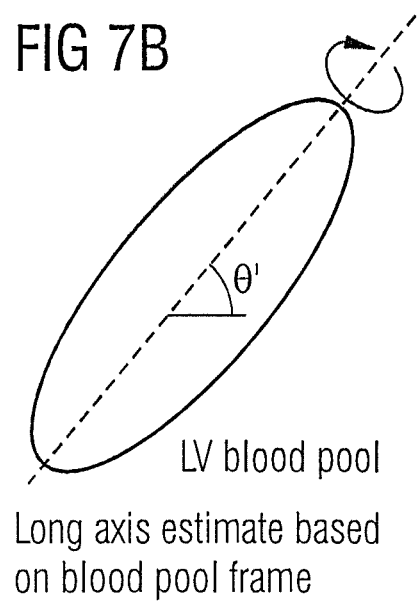

FIGS. 7A and 7B illustrate thresholding of reorientation angle. FIG. 7A illustrates an axis aligned at an angle θ as calculated from a late frame myocardial uptake image. FIG. 7B illustrates an axis aligned at an angle θ' as derived from the long axis of the blood pool image, illustrated by shading in the figure. If the angular difference between these two orientations θ, θ' exceeds a certain defined threshold t, a warning may be generated to a user.

That is, if a rotation angle θ that defines the initial estimate of the long axis estimate is grossly different to the angle θ' calculated from the blood pool image, then a warning may be provided.

Figure 8:
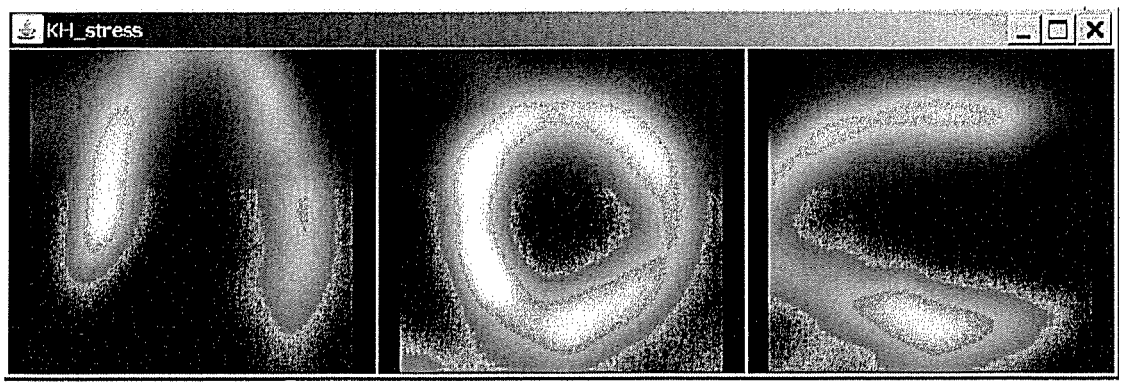
FIG. 8 illustrates different views of a heat imaged in a late frame, reoriented using angles estimated based on late myocardium and early blood pool frames.
Figure 9:
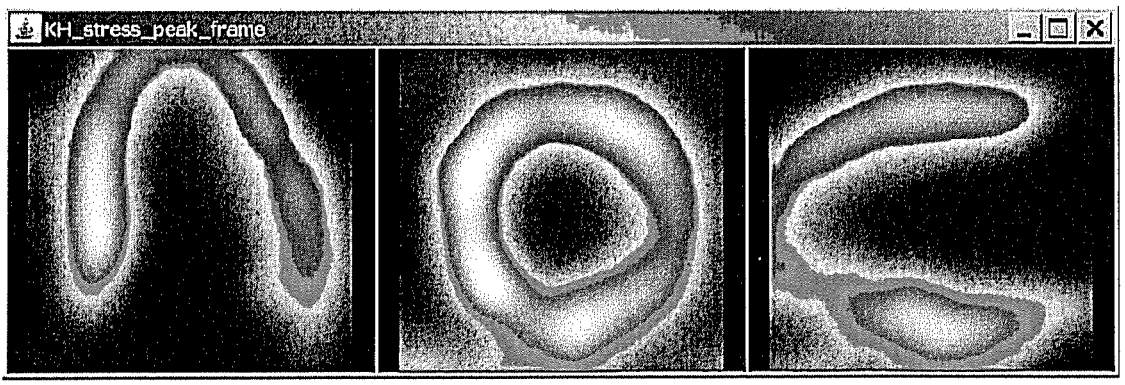
FIG. 9 illustrates different views of a heart imaged in a late frame, reoriented using angles derived from an early blood pool frame.
Figure 10:
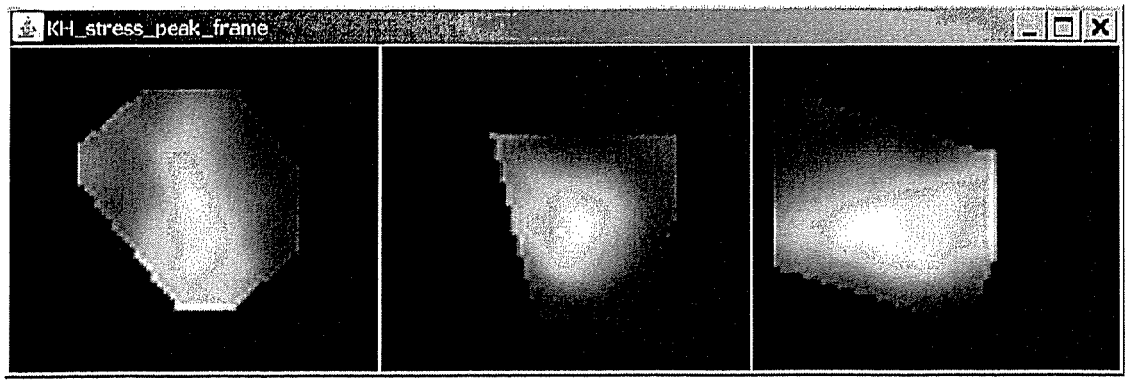
FIG. 10 shows different views of an early frame image of a heart, bounded by a bound box, reoriented using reorientation angles calculated from the early frame image.

FIG. 8 shows a late frame image reoriented using the angles estimated based on a late myocardium image frame and an early blood pool frame image.

The phase based method described in X-B Pan, S Bond, G Platsch, R Eisner, J Declerck, *Automatic Reorientation of Cardiac Perfusion PET Images Using Intensity and Contrast Invariant Structure Information*, IEEE NSS/MIC, Dresden, 19-25 Oct. 2008 may be used in this example.

Optionally, a computed reorientation angle based on the early frame could be combined with the initial reorientation from the late frame to improve the overall automatic reorientation accuracy.

This method could also be used to find an updated estimate of the orientation taking into account both the early and late frame estimates.

While the present invention has been described with reference to cardiac imaging of the left ventricle, the methods of the present invention may be applied to images representing other parts or features of the heart. In fact, the invention may be applied to images of human or animal body parts other than the heart, and references to myocardium should be interpreted as representing the appropriate muscle tissue.

While the present invention has been described in relation to PET and SPECT imaging modalities, the present invention may be applied to other imaging modalities which also have a time-variant characteristic.

Although modifications and changes may be suggested by those skilled in the art, it is the intention of the inventors to embody within the patent warranted hereon all changes and modifications as reasonably and properly come within the scope of their contribution to the art.

We claim as our invention:

1. A computerized method for estimating an orientation of a long axis of a muscular object, comprising:
   providing a computerized processor at least with an early frame image and a corresponding late frame image of a muscular object of a patient, obtained using an imaging modality having a time-invariant characteristic;
   via said processor, defining a bounding box of muscle tissue in said late frame image;
   in said processor, automatically applying the bounding box to the early frame image;
   in said processor, automatically estimating a main axis of the early frame image that is contained within the bounding box;
   in said processor, automatically reorienting the early frame image according to the estimated main axis;
   in said processor, automatically estimating a main axis of the late frame image contained within the bounding box;
   in said processor, automatically reorienting the late frame image according to the estimate main axis thereof; and
   in said processor, comparing the estimated main axis of the early frame image to the estimated main axis of the late frame image, to obtain a comparison result, and making an attribute of said comparison result available at an output of the processor as an electronic signal.

2. A method as claimed in claim 1 comprising providing said processor with cardiac images as said at least one early frame image and late frame image.

3. A method as claimed in claim 1 comprising providing said processor with at least said early frame image and said late frame image acquired from an imaging modality selected from the group consisting of a PET modality and an SPECT modality.

4. A method as claimed in claim 1 comprising determining said attribute of said comparison result in said processor as an angular difference in orientation between the estimated main axis of the early frame image and the estimated main axis of the late frame image, and determining whether said angular difference is larger than a predetermined threshold value and emitting a humanly perceptible warning, as said electronic signal, if said angular difference exceeds said predetermined threshold value.

5. A method as claimed in claim 1 comprising providing said processor with a plurality of image frames and, in said processor, automatically selecting said early frame image as a frame image that has a maximum in a time activity curve representing a tracer administered to the patient prior to acquisition of said plurality of image frames.

6. A method as claimed in claim 1 comprising, in said processor, automatically reorienting at least one of said early frame image and said late frame image using phase information.

7. A method as claimed in claim 1 comprising, in said processor, reorienting at least one of said early frame image and said late frame image using a respective moment of inertia thereof calculated in said processor.

8. A method as claimed in claim 1 comprising, from said processor, causing said early frame image to be displayed together with said late frame image at a display screen.

9. A method as claimed in claim 1 comprising, from said processor, causing said early frame image to be displayed fused with said late frame image at a display screen.

10. A computerized method for estimating an orientation of a long axis of the heart of a patient, comprising:

providing a computerized processor at least with an early frame cardiac image of the heart and a corresponding late frame cardiac image of the heart, obtained using an imaging modality selected from the group consisting of a PET modality and a SPECT modality;

via said processor, defining a bounding box of the myocardium of the heart in said late frame cardiac image;

in said processor, automatically applying the bounding box to the early frame cardiac image;

in said processor, automatically estimating a main axis of the early frame cardiac image that is contained within the bounding box;

in said processor, automatically reorienting the early frame cardiac image according to the estimated main axis;

in said processor, automatically estimating a main axis of the late frame cardiac image contained within the bounding box;

in said processor, automatically reorienting the late frame cardiac image according to the estimate main axis thereof; and in said processor, comparing the estimated main axis of the early frame cardiac image to the estimated main axis of the late frame cardiac image, to obtain a comparison result, and making an attribute of said comparison result available at an output of the processor as an electronic signal.

* * * * *